United States Patent
Sjoberg

(10) Patent No.: US 10,977,893 B2
(45) Date of Patent: *Apr. 13, 2021

(54) METHOD AND USER DEVICE PROVIDING OFFLINE PURCHASES OF AN IN-GAME ITEM

(71) Applicant: KING.COM LIMITED, St. Julians (MT)

(72) Inventor: Michael Sjoberg, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,236

(22) Filed: Aug. 28, 2019

(65) Prior Publication Data

US 2019/0385404 A1  Dec. 19, 2019

Related U.S. Application Data

(63) Continuation of application No. 15/923,111, filed on Mar. 16, 2018, now Pat. No. 10,417,863, which is a
(Continued)

(51) Int. Cl.
| | | |
|---|---|---|
| *A63F 13/00* | (2014.01) | |
| *G07F 17/32* | (2006.01) | |
| *A63F 13/30* | (2014.01) | |
| *G06Q 20/12* | (2012.01) | |
| *G06Q 20/06* | (2012.01) | |

(Continued)

(52) U.S. Cl.
CPC .......... *G07F 17/3225* (2013.01); *A63F 13/00* (2013.01); *A63F 13/30* (2014.09); *A63F 13/35* (2014.09); *A63F 13/48* (2014.09); *A63F 13/792* (2014.09); *G06Q 20/065* (2013.01); *G06Q 20/123* (2013.01); *G07F 17/3211* (2013.01); *G07F 17/3269* (2013.01)

(58) Field of Classification Search
CPC .......... A63F 13/00; A63F 13/30; A63F 13/35; A63F 13/48; A63F 13/792; G06Q 20/065; G06Q 20/123; G07F 17/3211; G07F 17/3225; G07F 17/3269
See application file for complete search history.

(56) References Cited

U.S. PATENT DOCUMENTS

| 8,920,243 B1 | 12/2014 | Curtis et al. |
| 2005/0192071 A1 | 9/2005 | Matsuno et al. |

(Continued)

FOREIGN PATENT DOCUMENTS

GB  2510430 A  8/2014

OTHER PUBLICATIONS

Anonymous, "Testing Internet Connectivity—CodePRoject", Retrieved from the Internet: URL:http://www.codeproject.com/Tips/147662/Testing-InternetConnectivity [retrieved on Apr. 22, 2016 XP055267936, Jan. 19, 2011.

*Primary Examiner* — Justin L Myhr
(74) *Attorney, Agent, or Firm* — Saul Ewing Arnstein & Lehr LLP

(57) ABSTRACT

A user device supports a computer implemented game. An input from a user is received. This input requests a purchase of an in-game item. When this input is received, a determination is made as to whether the user device is on-line or not. If the user device is off-line, it is determined if the in-game item can be purchased in dependence on a locally available in-game currency budget. If so, the requested in-game item is provided in the computer implemented game.

20 Claims, 6 Drawing Sheets

| User ID | Ability to make offline purchases | Available item for purchases | Game budget | Devices of user |
|---|---|---|---|---|
| 402 | 404 | 406 | 408 | 410 |

Related U.S. Application Data continuation of application No. 14/614,571, filed on Feb. 5, 2015, now Pat. No. 9,934,648.

(51) Int. Cl.
*A63F 13/35* (2014.01)
*A63F 13/48* (2014.01)
*A63F 13/792* (2014.01)

(56) References Cited

U.S. PATENT DOCUMENTS

| | | |
|---|---|---|
| 2007/0298886 A1 | 12/2007 | Aguilar et al. |
| 2008/0127209 A1 | 5/2008 | Gale et al. |
| 2010/0167814 A1 | 7/2010 | Kim et al. |
| 2014/0278844 A1 | 9/2014 | Khanna |

| User ID | Ability to make offline purchases | Available item for purchases | Game budget | Devices of user |
|---|---|---|---|---|
| 402 | 404 | 406 | 408 | 410 |

Figure 4

METHOD AND USER DEVICE PROVIDING OFFLINE PURCHASES OF AN IN-GAME ITEM

CROSS-REFERENCE TO RELATED APPLICATIONS

This is a continuation of U.S. application Ser. No. 15/923,111, filed on Mar. 16, 2018, which is a continuation of U.S. application Ser. No. 14/614,571, filed on Feb. 5, 2015, the entire contents of which being fully incorporated herein by reference.

FIELD OF INVENTION

Some embodiments relate to a user device and a server for use in playing a computer implemented game. Some embodiments relate to a method for use in playing a computer implemented game. Some embodiments relate to a computer program for use in playing a computer implemented game.

BACKGROUND OF THE INVENTION

Designers of computer games face significant technical challenges when designing games for so called "social" or "casual" gaming.

One such technical challenge is that of user engagement. Engagement involves designing gameplay to be engaging and rewarding for players. Typically designing games to be engaging requires providing gameplay that is at first simple yet increases in complexity so that players are rewarded and retain interest through increasing skill development and challenges.

Some games are designed to be played such that various purchases may be made when the user device is online. For those games which can also be played off-line, it can be frustrating for a user who is unable to make any purchases when off-line.

This patent specification describes not only various ideas and functions, but also their creative expression. A portion of the disclosure of this patent document therefore contains material to which a claim for copyright is made and notice is hereby given: Copyright King.com Limited 2014 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a method for providing a computer implemented game in a user device, the user device comprising at least one processor, a user interface and a display, the method comprising: receiving from the user interface, an input from a user requesting a purchase of an in-game item having an associated currency value; and in response to said input requesting the purchase of the in-game item, determining if the user-device is off-line; and on determining that said user device is off-line, determining, in dependence on a locally available in-game currency budget, if the in-game item can be purchased and if so providing the in-game item in the computer implemented game.

The method may comprise storing information on said purchased in-game item for providing to a server when the user device is on-line.

The method may comprise transmitting from the user device information on said purchased in-game item when the user device is on-line.

The method may comprise in response to receiving said input requesting the purchase of the in-game item, providing a message for transmission from the user device with information about the requested in-game purchase.

The method may comprise setting a timer when the message is provided.

The determining if the user device is off-line may comprise setting a timer when said message is provided and determining that said user device is off-line if a response to the message is not received within a time period, the timer being set to the time period.

The method may comprise determining if a user of the user device is permitted to make purchases when the device is off-line and only if so providing the in-game item in the computer implemented game.

The determining if the user of the user device is permitted to make purchases when the device is off-line may comprise using information received by the user device from a server, when the user device is on-line.

The method may comprise receiving locally available in-game currency budget information from the server, when the user device is on-line.

On determining that said user device is not off-line, the method may comprise sending a request to a server requesting the purchase of the in-game item, receiving a response from said server and in response to said response, providing the in-game item in the computer implemented game.

According to another aspect, there is provided a computer implemented method of providing game information to a user device supporting a computer implemented game, the method comprising: receiving from at least one user device of a user, information about at least one purchase of an in-game item made when the computer implemented game is being played on the at least one user device of the user and said at least one user device is off-line; in response to the information, updating locally available in-game currency budget information for the user and storing said updated locally available in-game currency budget information in a database in association with information identifying said user; and transmitting to at least one user device of said user, said updated locally available in-game currency budget information.

The method may comprise determining that the purchase of the at least one in-game purchase exceeds an available currency budget associated with the user and updating said locally available in-game currency budget to zero.

The method may comprise transmitting information to a plurality of user devices, at least one user device receiving information indicating that off-line purchases are permitted and at least one user device receiving information indicating that off-line purchases are not permitted.

According to an aspect there is provided a user device comprising: a user interface configured to receive an input from a user requesting a purchase of an in-game item having an associated currency value; at least one processor configured to determine, in response the input requesting the purchase of the in-game item, if the user-device is off-line and if the user device is off-line to determine if the in-game purchase can be made in dependence on a locally available in-game currency budget and if so providing the in-game purchase in a computer implemented game.

The user device may comprise at least one memory, said at least one memory configured to store information on the purchased in-game item for providing to a server when the user device is on-line.

The user device may comprise a transmitter configured to transmit from the user device information about the purchase in-game purchase item when the user device is on-line.

The at least one processor may be configured in response to receiving said input requesting the purchase of the in-game item to provide a message for transmission from said user device with information about the requested in-game purchase.

The user device may comprise a timer configured to be set when the message is provided.

The at least one processor may be configured to determine that the user device is off-line if a response to the message is not received within a time period, the timer being set to the time period.

The at least one processor may be configured to determine if a user of the user device is permitted to make purchases when the device is off-line and only if so providing the in-game item in the computer implemented game.

The at least one processor may be configured to determine if the user of the user device is permitted to make purchases when the device is off-line by using information received by the user device from a server, when the user device is on-line.

The user device may comprise a receiver configured to receive locally available in-game currency budget information from the server, when the user device is on-line.

On determining that said user device is not off-line, a transmitter may be configured to send a request to a server requesting the purchase of the in-game item; a receiver may be configured to receive a response from said server and in response to said response, the at least processor may be configured to providing the in-game item in the computer implemented game.

According to another aspect there is provided a server configured to provide game information to a user device supporting a computer implemented game, the server comprising: a receiver configured to receive from at least one user device of a user, information about at least one purchase of an in-game item made when the computer implemented game is being played on the at least one user device of the user and said at least one user device is off-line; at least one processor configured to, in response to the information, update locally available in-game currency budget information for the user and storing said updated locally available in-game currency budget information in a database in association with information identifying said user; and a transmitter configured to transmit to at least one user device of said user, said updated locally available in-game currency budget information.

The at least one processor may be configured to determine that the purchase of the at least one in-game purchase exceeds an available currency budget associated with the user and updating said locally available in-game currency budget to zero.

The transmitter may be configured to transmit information to a plurality of user devices, at least one user device receiving information indicating that off-line purchases are permitted and at least one user device receiving information indicating that off-line purchases are not permitted.

According to an aspect, there is provided a program product comprising a computer-readable storage device including a computer-readable program for providing a computer-implemented game, wherein the computer-readable program when executed on a computer causes the computer to receiving an input from a user requesting a purchase of an in-game item having an associated currency value; and in response to said input requesting the purchase of the in-game item, determine if the user-device is off-line; and on determining that said user device is off-line, determine, in dependence on a locally available in-game currency budget, if the in-game item can be purchased and if so providing the in-game item in the computer implemented game.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 4 illustrates an example user device of an embodiment;

DETAILED DESCRIPTION OF EMBODIMENTS

The terms user and player are used interchangeably throughout this document and no specific meaning is intended using one or the other unless the context suggests otherwise. A person skilled in the art will realise that the different approaches to implementing the embodiments are not exhaustive, what is described herein are certain preferred embodiments.

Figure 5:
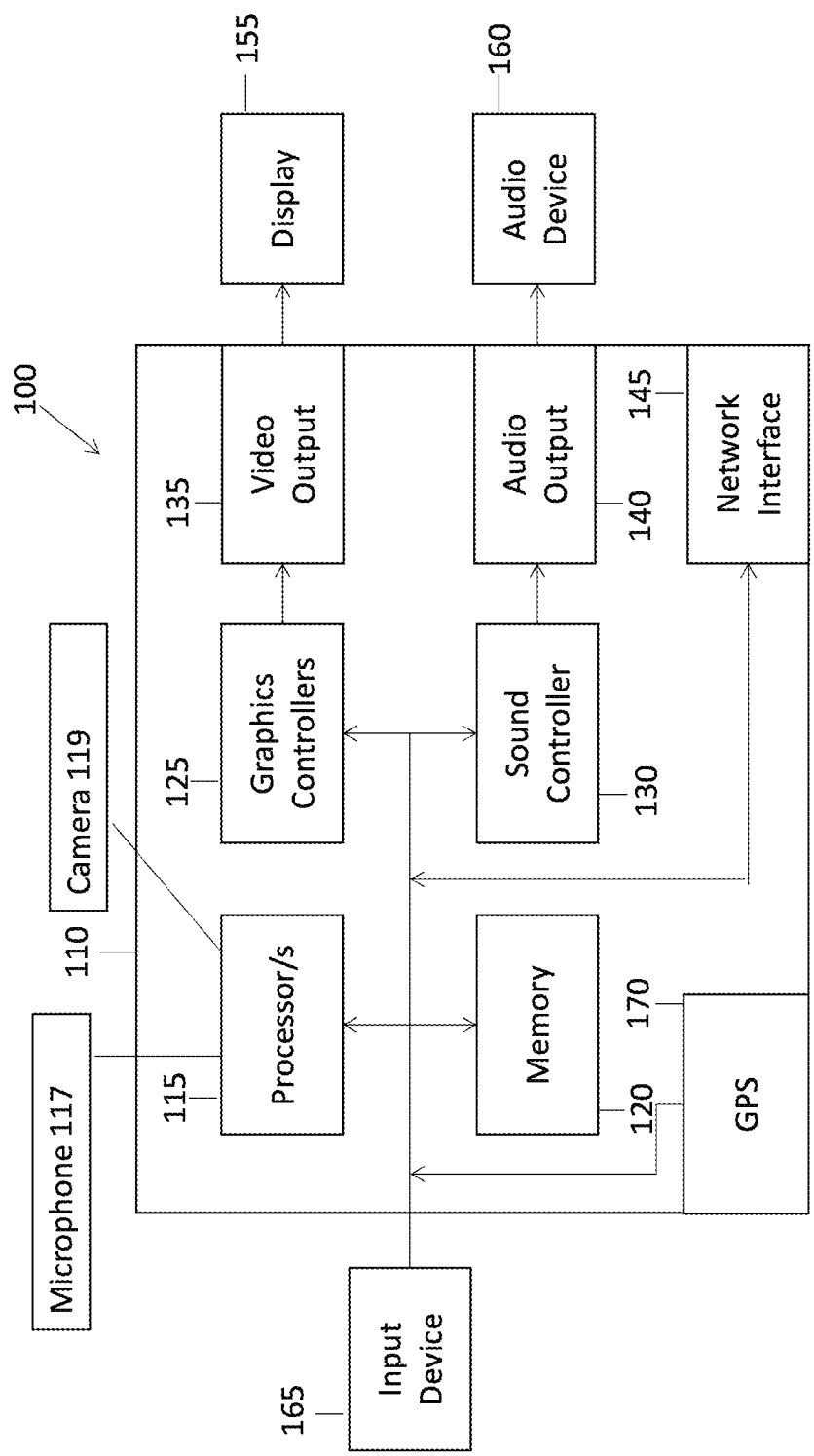
FIG. 5 illustrates an example system in which some embodiments may be provided.

A schematic view of a user device 100 according to an embodiment is shown in FIG. 5. All of the blocks shown are implemented by suitable circuitry. The blocks may be implemented in hardware and/or software. The user device may have a control part 110. The control part may be implemented by one or more processors 115 and one or more memories 120.

The control part 110 is shown as having a graphics controller 125 and a sound controller 130. It should be appreciated that one or other or both of the graphics controller 125 and sound controller 130 may be provided by the one or more processors 115 or may be separately provided.

The graphics and sound controllers may comprise memory and/or may operate in conjunction with the one or more memories 120.

The graphics controller 125 is configured to provide a video output 135. The sound controller 130 is configured to provide an audio output 140. The video output 135 is provided to a display 155. The audio out 140 is provided to an audio device 160 such as a speaker and or earphone(s).

An audio capture device such as a microphone 117 may be provided. An audio input may be captured by the microphone and may be processed by the processor and/or any other suitable processor. This is optional is some embodiments In other embodiments, the sound controller and audio device may additionally capture and process audio data.

An image capture device 119 may be provided. The image capture device is a camera in some embodiments. The image captured by the camera may be processed by the processor and/or any other suitable processor. This is optional is some embodiments.

The control part 110 has an interface 145 allowing the device to be able to communicate with a network such as the Internet or other communication infrastructure. The control part 110 may have a GPS module 170 or similar configured to provide location information to the at least one processor 115 or memory 120. This is optional is some embodiments.

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the control part 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 6:
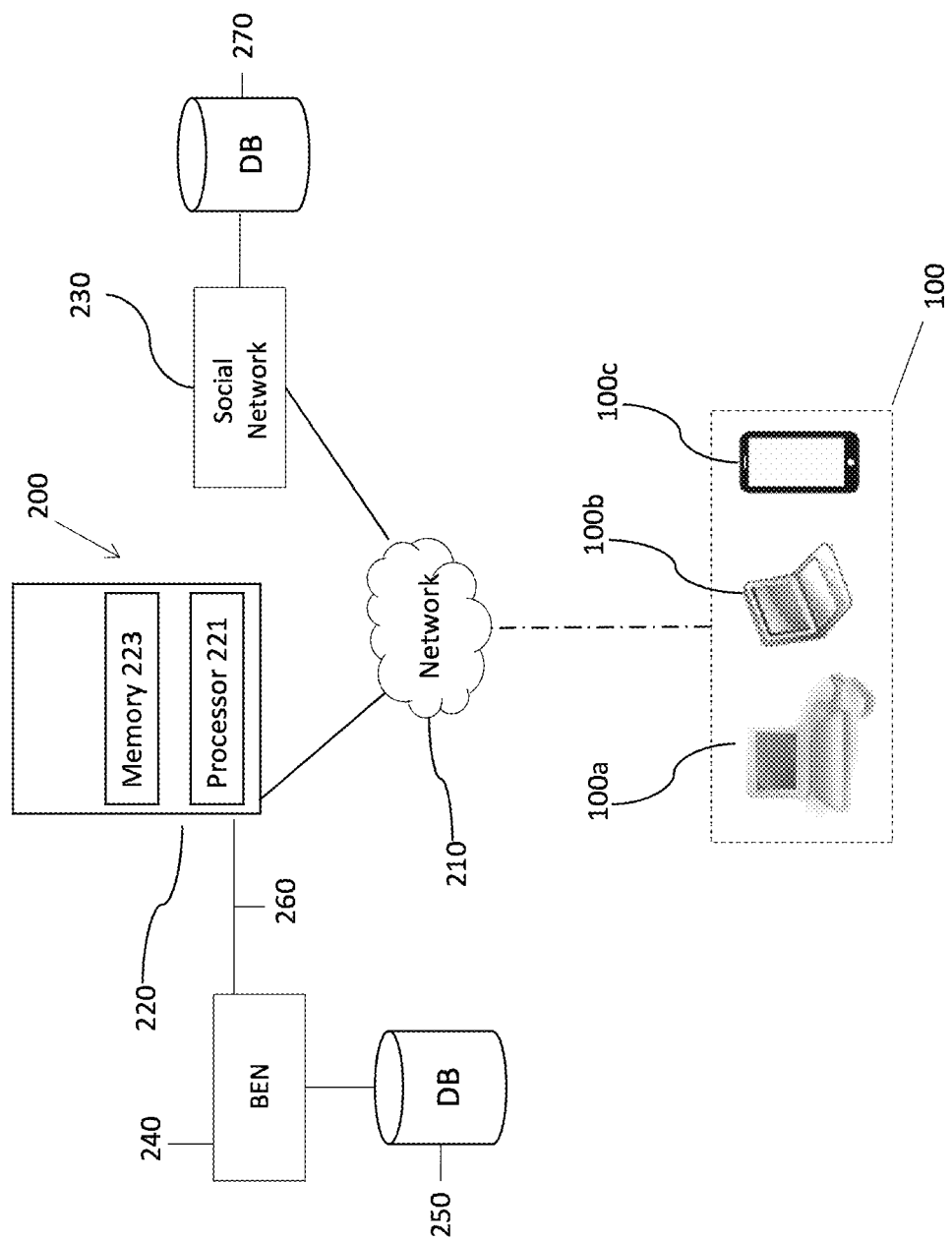
FIG. 6 schematically shows a system according to an embodiment of the invention.

FIG. 6 schematically shows a system 200 according to an embodiment. The system 200 comprises a server 220 which may store or be in communication with database 250 which may, in some embodiments, be connected to a back end infrastructure (BEN) of game player's details, profiles, statistics etc. In practice, one or more databases 250 may be provided. In practice, one or more servers 220 may be provided. Where one or more server is provided, the database(s) 250 may be provided in one database 250 across two or more servers. The server(s) 220 may also have a games data function. This may comprise one or more units of memory 223 to store the computer game program, user behaviour data and a control part to run the games program and process the user behaviour data. The control part may comprise one or more processors 221.

The server 220 may communicate via, for instance, the internet 210 to one or more client or user devices 100, shown in FIG. 6 by way of example as user devices 100*a*, 100*b* and 100*c*, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 100.

It should be recognised by those skilled in the art that the databases herein referred to may comprise external or remote storage, such as that described as being in a "cloud".

Figure 1:
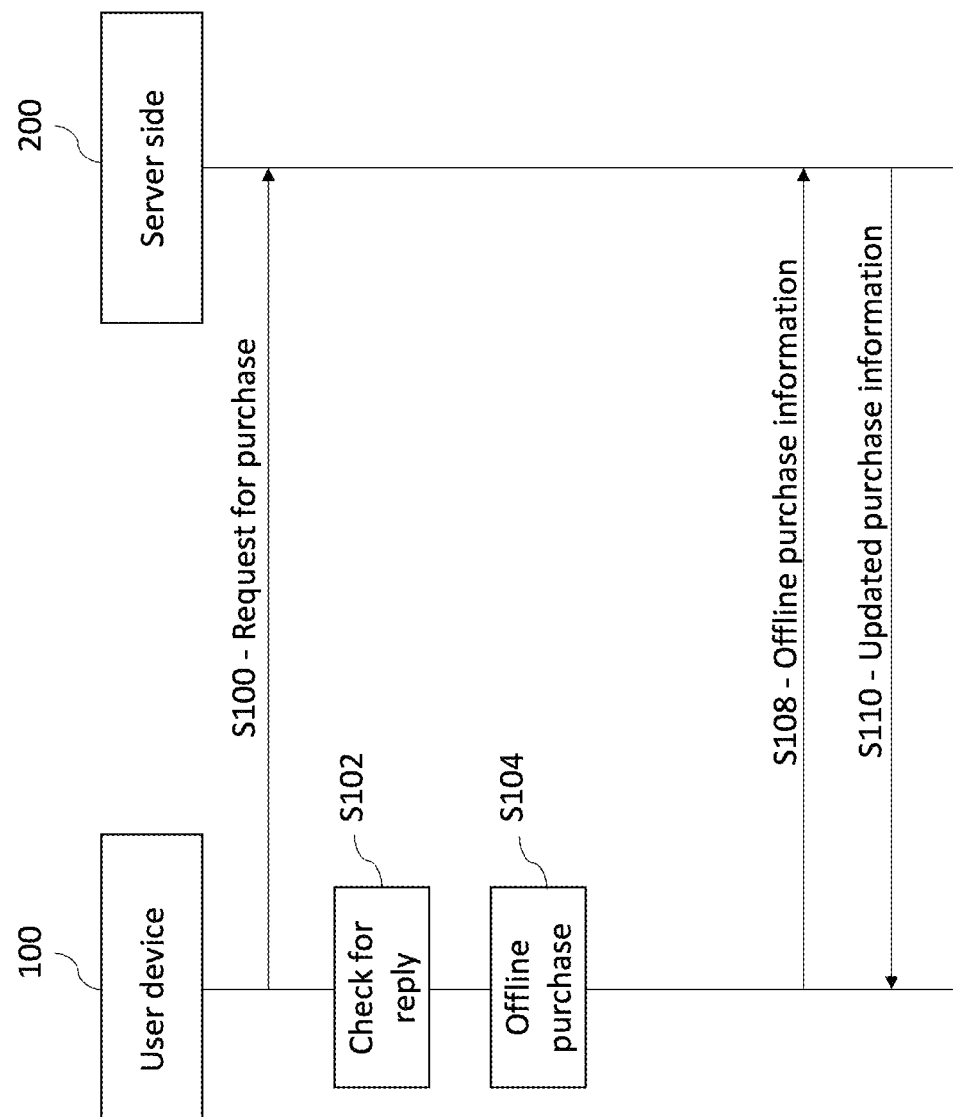
FIG. 1 schematically shows a signal flow between a user device and a server side.

Reference is made to FIG. 1 which schematically shows a signal flow between a user device 100 and the server side 200.

In step S100, the user device transmits a request for a purchase to the server side 200. This request may comprise information identifying the nature of the purchase. The request is transmitted via a network to the server.

In some embodiments, the user may wish to purchase a particular in-game item having a monetary value associated therewith. The in-game item may be any suitable in-game item such as one or more extra lives, one or more game boosters, one or more lives or any other game item. In some embodiments, the user may wish to purchase in-game currency which can then be used to purchase in-game items. For example the in-game currency may be represented by gold bars. It should be appreciated that this is by way of example only and in other embodiments, the in-game currency may correspond to real currency or may be represented in any other suitable way.

An in-game item may have display information associated therewith. When an in-game item is purchased, the processor may be configured to cause image data associated with the in-game item to be displayed. The in-game item may have one or more game functions associated therewith. For example, a user may select via the user interface to use the in-game item. When the in-game item has been selected, the processor may be configured to apply the associated action. The associated action may be a game action such as removal of one or more other game elements, the provision of one or more lives or any other game action.

Some embodiments may be used where the purchase of the in-game item is directly or indirectly associated with real currency. The user thus has to pay for the purchase of the in-game item. This may be done using a credit/debit card arrangement, a regular billing arrangement, allowing the user to credit his account with funds available for use in purchasing items and/or any other suitable mechanism for payment.

Each of the in game purchases may have a currency value. The user will generally need to pay real money either directly or indirectly to purchase the in-game items. For example a user may purchase in-game currency which is used to in the game to purchase in-game items.

In some embodiments, the user may a fee to play the game which will include a certain value of in-game purchases. Usage of this allowance may be monitored at the server side.

In some embodiments, the user may have a pre-paid amount available. In other embodiments, the user may have a defined credit limit. Information about this is retained on the server side.

In step S102, the user device will determine if a response has been received to the request, from the server side. This is described in more detail with reference to FIG. 2.

In the example described, a message is provided for sending. In some embodiments, the message may be transmitted from the device, as schematically shown in FIG. 1. In other embodiments, the message may be provided to the transmitter of the device but is not transmitted by the device, for example because the transmitter has been switched off.

In some embodiments, a timer may be set and if it is determined that no reply has been received before the timer has expired, then it may be determined that the device is off-line.

The user device may use any other suitable method to determine that the user device is off-line.

The user device may receive information indicating that the device is off-line. This may be information received from the part of the user device which controls the setting and/or status of the device. In those embodiments, the message of S100 may be omitted.

The user device may determine when a message was last received from the server and if that exceeds a certain time period then the device may be determined to be off-line.

In the example shown in FIG. 1, no reply is received and accordingly, in step S104, an off line purchase is made. The user device is in an off line mode in which the user device is not able to communicate with the server. For example, the user device may be out of range of a network or the user may have switched off the network connection. The off-line purchase may be any suitable purchase. For example, the user may purchase one or more in game items and/or in-game currency used to purchase one or more in-game items. The off-line purchase may be permitted if the associated cost thereof falls within an available offline budget.

In some embodiments the server side may periodically send a request for an update. However, this is optional in some embodiments. In other embodiments, the user device may be configured such that the user device will send a message to the server side when a network connection is available.

The user device may use any suitable method to determine that the user device is on-line.

The user device may receive information indicating that the device is on-line. This may be information received from the part of the user device which controls the setting and/or status of the device. This information may alternatively or additionally received from the server. Any message received from the server in some embodiments may indicate that the user device is on-line.

In other embodiments, the processor may be configured to provide one or more messages for transmission. When a response is received to one or more messages, the processor is configured to determine that the device is on-line. The device may use a timer mechanism. If a response to a message is not received in a given time frame, the device is determined to still be off-line. A message may be provided for sending at regular time intervals until a response is received. In some embodiments, the frequency at which the messages are provided may depend one or more factors. For example, the frequency of the messages may be dependent on how recently the device was last on-line.

It should be appreciated that any other suitable mechanism may alternatively or additionally be used in some embodiments to determine that the device is on-line.

In step S108, in response to the request for the updated information or when the network connection is available, the user device will send information about the off-line purchases made, in step S104.

The server side will update the database in response thereto. This is described in more detail with reference to FIG. 3.

The server will send updated purchase information in step S110 to the user device. This would be described in more detail later.

If the user device is on-line, the server will send a response to the request for the purchase. The server will check if the user has sufficient funds to make the purchase and/or will may make a credit/debit card transaction and/or has sufficient credit to make the purchase. If the purchase is approved, the response will comprise authorization for the requested in-game purchase. The response may also comprise an updated off-line budget. This information may alternatively be separately sent.

A game engine on the user device will have information about the in-game device. However authorization for the in-game purchase may need to be provided, either as described in relation to FIG. 1 or from the server.

Figure 2:
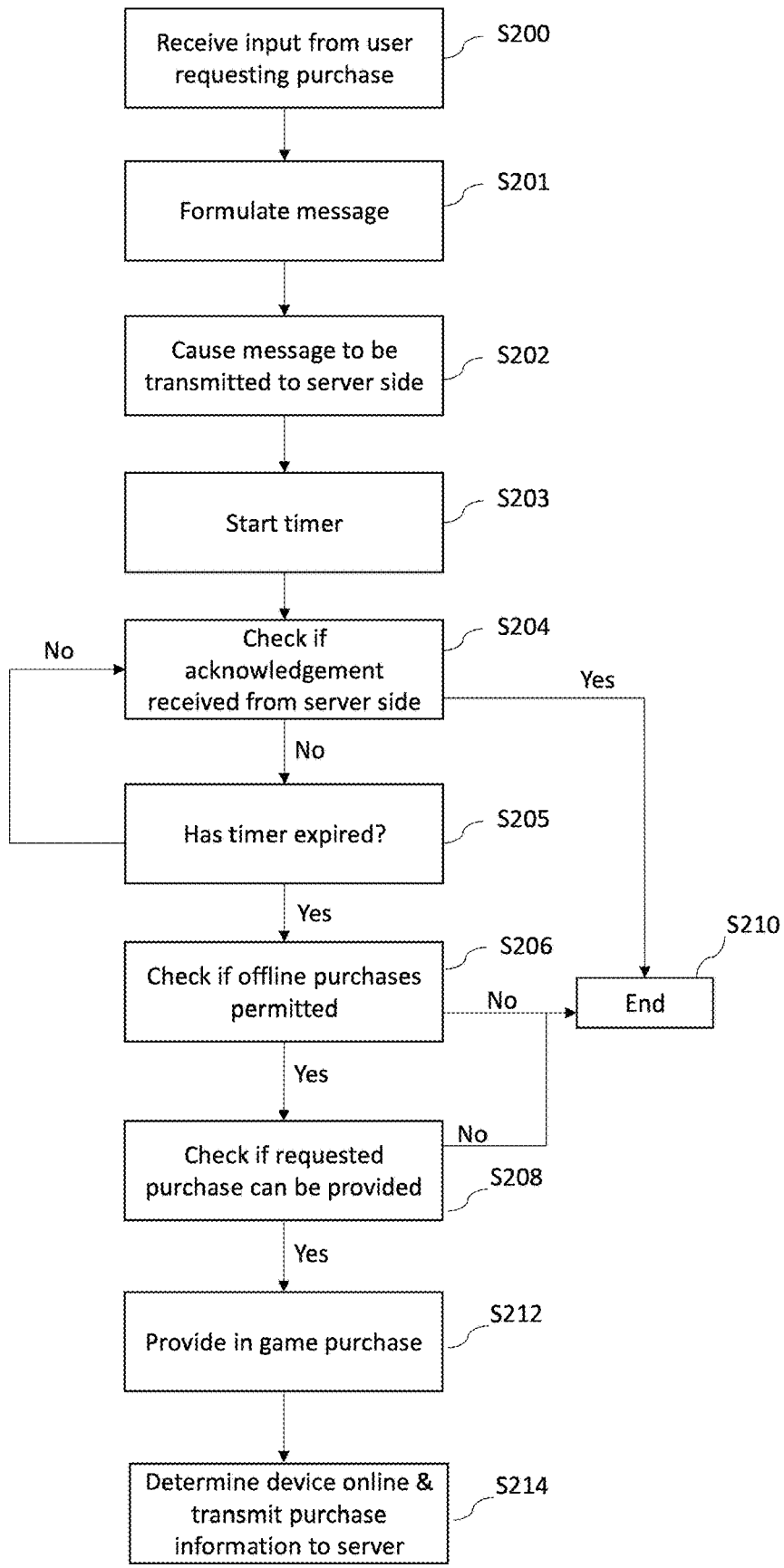
FIG. 2 schematically shows a method performed by the user device.

Reference is made FIG. 2 which shows a flow in the user device.

In step S200, the user device is configured such that an input is received from the user via the user interface requesting a purchase. For example, the user may have requested one or more in game item and/or in-game currency. In response to receiving the request from the user, the user device is configured to determine if the user device is off-line. This may be done in any of the ways discussed previously. The method of FIG. 2 is described in the context of the message/timer option but is should be appreciated that steps S202 to S205 may be replaced by any other suitable method for determining if the device is off-line.

In step S201, a message is formulated by the user device. This message will include information of the requested purchase. This is responsive to the user input received via the user interface requesting the purchase of an in-game item.

In step S202, the user equipment is configured to cause this message to be transmitted to the server side or at least provided for transmitting to the server.

In step S203, a timer is started. The timer may be a count up timer or a countdown timer. It should be appreciated that some embodiments, steps S202 and S203 may take place generally at the same time. The timer may be implemented in hardware, software or by a combination thereof. The providing of the message may start the timer.

In step S204, a check is made to see if any form of acknowledgement has been received from the server side to the request. This can be a reply to the request, a simple acknowledgement or any other suitable messaging which indicates that the request has been received at the server side.

If an acknowledgement has been received, then the next step is step S210 which ends the flow of FIG. 2. If no acknowledgement has been received, the next step is step SS204 in which a check is made to see if the timer has expired. In other words has the timer counted up or down to the end value.

If not, then the method goes to step S204. If the timer has expired, the next step is step S206. A check is made to see if off-line purchases are permitted. In some embodiments, the server will permit certain users to take of make offline purchases. If a user is permitted to make an off-line purchase, then the user device will have information indicating this. Some embodiments, this information may be indicated by a flag which is either set or not. It should be appreciated that if off-line purchases are permitted, the server will periodically update the user device with information indicating an available budget for the user. In some embodiments, this step may be omitted, in that the user device may only be permitted to perform the method of FIG. 2 if the user is permitted to make off-line purchases.

If no off-line purchases are permitted, then the next step is step S210. If off-line purchases are permitted, then the next step is step S208. In this step, the user device will determine if the requested purchase can be made. In other words, a check may be made to see if the available budget is large enough to permit the requested purchase. In some embodiments, this step may be carried out after step S200 or at any other suitable point in the method flow. If the available budget is not sufficient for the requested purchase, the next step is step S210.

If the available budget is sufficient, then the requested in-game item to be purchased is provided in step S212. The available budget is reduced by the amount associated with the purchase. In some embodiments, information associated with the purchased item may be stored in memory. This information may be provided to the server in step S14. The information may comprise one or more of information on the value of the purchased item and information on the purchased item. The information may be stored in the form of a message or in a form such that it can be included in a message.

The method steps of FIG. 2 may be repeated while the user device is off-line. The user is able to use up all of the available budget but may not be permitted to exceed the available budget.

In step S214, a determination is made that the device is on-line and able to communicate with the server Once the device is on-line, the purchase information is sent to the server. The user device may provide the information stored in step S212. Where more than one purchase has been made, information associated with each purchase may be included in the same message. Alternatively the information may be provided in separate messages. In some embodiment, information on the currently available budget may alternatively or additionally be provided to the server.

It should be appreciated that this determination that the device is on-line may be made in any suitable manner. For example, this may be responsive to a change in the settings in the user device. Alternatively, the server may periodically send a message and responsive to receipt of this message by the user device, a determination may be made that the device is on line. Any other suitable method may be used. Some examples are previously described.

In some embodiments, the user device may not perform a specific determining that the user device is on-line. Rather the processor may be configured to provide messages for transmission, determining if a message has been successfully transmitted if a response is received from the server. This may use a timer as discussed previously. One or more of these messages may comprise information relating to the purchased item.

The user device may receive updated information indicating the available budget for in game purchases in the event that the user goes off-line again.

The method of FIG. 2 may be carried out at the device and may be performed by at least one processor operating in conjunction with at least one memory.

Figure 3:
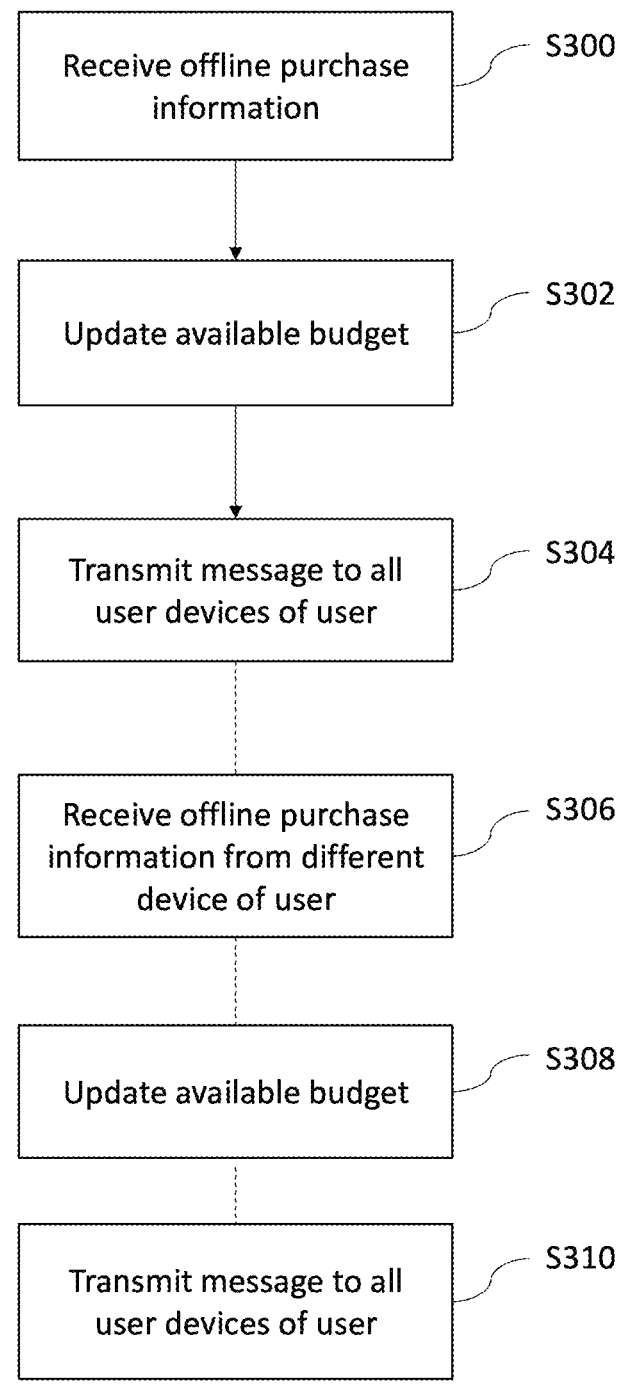
FIG. 3 schematically shows a method performed at the server.

Reference is made to FIG. 3 which shows a method flow on the server side. In step S300, the server will receive off-line purchase information associated with a user from a user device. This is information indicating the purchases which have been made by the user device when the user device is off-line. It should be appreciated that the off-line purchase information may be provided along with other information such as synchronization information indicating for example game progress.

In step S302, the server will update the available budget to take into account the purchases made by the user while off-line.

In step S304, the server will transmit a message to the user device. In some embodiments, this is transmitted to all of the user devices of the user that are on-line. These messages may be sent at the same time or at different times. This will comprise information about the new available budget. This may be included with other information which is being transmitted to the user device(s).

In some embodiments, step S304 may be in response to the user device having provided the necessary information about all the purchases and then polled the server for the new balance. For example, the user device may determine if a queue provided in memory with information for the server has been emptied and if so will then poll the server.

In embodiments, steps S300 and S302 may be performed a plurality of times before step S304 is performed.

Steps S306 to S310 are optional and illustrate a scenario where a user has been playing the same game on two (or possibly more) different devices, both of which have been off-line.

In step S306, the server receives off-line purchase information from a different device of the user. This is generally as described in step S300.

In step 308, the available budget is updated by the server, as described in step S302.

It should be appreciated that in some embodiments, the user may have exceeded the available budget because he had played on two different off-line devices. In some embodiments, the available budget may be reduced to zero if the available budget has been exceeded. This check may be carried out each time the available budget is updated.

It should be appreciated that in some embodiments, the server may look at the progress information of a user, the in-game purchases and device information to determine the amount by which the available budget is to be updated by. For example, if a user has used two gold bars on one device to get to level 20 and has also used two gold bars on another device to get to get to level 20, the server may only deduct the value associated with two gold bars from the available the budget.

In step S310, a message is transmitted to all user devices of the user, which are on line, with the updated available budget. This may be as described in relation to step S304.

In some embodiments, if the user exceeds or repeatedly exceeds the available budget by using two or more devices off-line, then the status of the user may be changed so that the user is no longer able to make off-line purchases. This may be if the user has exceeded the available budget by more than a certain amount and/or has exceeded the available budget a certain number of times. This may have a time window associated with this.

The method of FIG. 3 may be carried out at the server side and may be performed by at least one processor operating in conjunction with at least one memory.

Reference is made to FIG. 4 which schematically shows the data structure of user data which may be stored in the server side. The data may be stored in a database or memory. The data structure has a first field which may comprise information identifying the user. This is referenced 402. This may take any suitable form and may comprise one or more pieces of information. For example, this may include information such as the users email address and avatar. The data structure also includes a field 404 which will indicate whether or not the user is able to make off-line purchases. In some embodiments, this may be a flag which is either set or not.

In the third field 406, the available budget may be provided. It should be appreciated in some embodiments, an off-line budget may be set which is different from the total available budget. In some embodiments, each device of a user may be set its own off-line budget. The total of the off-line budgets may be less than the total available budget.

The fourth field 408 has game information. This may include the progress of the user. In some embodiments, more than one game field may be provided.

In the last field 410, the different devices of a user may be identified. In some embodiments this may be optional.

In some embodiments, one or more additional fields may be provided for example to provide information about other games played by the user.

It should be appreciated that the fields may be provided in any order.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A method performed in a user device comprising:
   determining if a user of a user device is permitted to make a purchase when the user device is offline in dependence on information received from a server;
   determining that a purchase request for the purchase of at least one in game item has been made;
   wherein when the user device is off-line:
   determining if the purchase can be made, wherein the determining if the purchase can be made comprises comparing purchase information associated with the purchase to an available budget;
   providing an in game item when the user of the user device is permitted to make a purchase when the user device is offline and the purchase of the purchase request can be made,
   subsequently determining that the user device is online; and
   transmitting to the server a first message indicating the purchase of the in game item.

2. The method of claim 1, wherein the available budget comprises a budget for performing purchases when the user device is offline.

3. The method of claim 1, wherein the information received from the server comprises an indication, the indication indicating whether offline purchases are permitted when the user device is offline.

4. The method of claim 3, wherein the indication comprises a flag, wherein the flag is set if offline purchases are permitted when the user device is offline, and the flag is not set if offline purchases are not permitted.

5. The method of claim 3, wherein the indication causes a flag to be either set or not set to indicate if offline purchases are permitted when the user device is offline or not.

6. The method of claim 1, comprising determining that the user device is offline if a response to an attempt to transmit a purchase request to the server is not received within a time period.

7. The method of claim 6, comprising using a timer to determine the time period, the timer being started when the attempt to transmit a purchase request to the server is provided.

8. The method of claim 1, comprising storing the available budget in memory on the user device.

9. The method of claim 8, comprising updating the available budget stored on the user device in response to providing the game item.

10. The method of claim 1, comprising determining that the purchase of the at least one in game item exceeds the available budget and updating the available budget to zero.

11. The method of claim 1, wherein the available budget is dependent on a master budget stored on the server.

12. The method of claim 11, wherein the master budget is updated in response to the server receiving the first message indicating the purchase of the game item.

13. The method of claim 1, wherein determining that a purchase request for at least one in game item has been made comprises receiving user input via a user interface.

14. The method of claim 1, wherein the first message indicating the purchase of the in game item comprises additional information.

15. The method of claim 14, wherein the additional information comprises game state information.

16. The method of claim 1, comprising determining whether the user device is offline or online in response to determining that the purchase request for at least one game item is to be made.

17. The method of claim 1, comprising determining whether the user device is offline or online prior to determining that the purchase request for at least one game item has been made.

18. The method of claim 1, wherein the in game item comprises an in game currency.

19. A user device comprising:
a receiver;
a transmitter;
at least one memory; and
at least one processor,
wherein the at least one memory and at least one processor are configured to cause the user device to:
determine if a user of a user device is permitted to make a purchase when the user device is offline, in dependence on information received from a server;
determine that a purchase request for the purchase of at least one in game item has been made;
wherein when the user device is off-line the at least one memory and at least one processor are configured to cause the user device to:
determine if the purchase can be made, wherein the determining if the purchase can be made comprises comparing purchase information associated with the purchase to an available budget;
provide an in game item when the user of the user device is permitted to make a purchase when the user device is offline and the purchase of the purchase request can be made; and
subsequently determine that the user device is online;
the transmitter being configured to transmit to the server a first message indicating the purchase of the in game item.

20. A non-transitory computer program product comprising instructions which, when implemented by at least one processor, cause a user device to:
determine if a user of a user device is permitted to make a purchase when the user device is offline, in dependence on information received from a server;
determine that a purchase request for the purchase of at least one in game item has been made;
wherein when the user device is off-line:
determine if the purchase can be made, wherein the determining if the purchase can be made comprises comparing purchase information associated with the purchase to an available budget;
provide an in game item when the user of the user device is permitted to make a purchase when the user device is offline and the purchase of the purchase request can be made,
subsequently determine that the user device is online; and
transmit to the server a first message indicating the purchase of the in game item.

* * * * *